United States Patent
Kokami et al.

(10) Patent No.: US 7,710,678 B2
(45) Date of Patent: *May 4, 2010

(54) VCM DRIVER AND PWM AMPLIFIER

(75) Inventors: Yasuhiko Kokami, Tokyo (JP); Hiroshi Kuroiwa, Tokyo (JP)

(73) Assignee: Renesas Technolgy Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/169,891

(22) Filed: Jul. 9, 2008

(65) Prior Publication Data

US 2009/0080115 A1 Mar. 26, 2009

(30) Foreign Application Priority Data

Sep. 20, 2007 (JP) ............................. 2007-243662

(51) Int. Cl.
*G11B 5/02* (2006.01)
*G11B 21/02* (2006.01)

(52) U.S. Cl. ......................................... 360/67; 360/75
(58) Field of Classification Search ....................... None
See application file for complete search history.

(56) References Cited

U.S. PATENT DOCUMENTS

| | | | |
|---|---|---|---|
| 6,040,674 A * | 3/2000 | Nishida et al. | 318/632 |
| 6,216,050 B1 * | 4/2001 | Ono et al. | 700/72 |
| 6,417,639 B1 * | 7/2002 | Schillaci et al. | 318/560 |
| 6,903,894 B2 | 6/2005 | Kokami et al. | |
| 7,034,490 B2 * | 4/2006 | Sawtell et al. | 318/569 |
| 7,224,135 B1 * | 5/2007 | Menegoli et al. | 318/400.26 |
| 7,280,308 B2 | 10/2007 | Kokami et al. | |
| 7,352,246 B2 * | 4/2008 | Mazda et al. | 330/310 |
| 7,498,876 B2 * | 3/2009 | Peruzzi et al. | 330/10 |

FOREIGN PATENT DOCUMENTS

| | | |
|---|---|---|
| JP | 2002-184137 | 6/2002 |
| JP | 2005-304095 | 10/2005 |
| JP | 2005-304096 | 10/2005 |

\* cited by examiner

*Primary Examiner*—K. Wong
(74) *Attorney, Agent, or Firm*—Mattingly & Malur, P.C.

(57) ABSTRACT

The present invention provides a VCM driver realizing low power consumption and high accuracy and a PWM amplifier compensating a dead time distortion. A phase compensator, a ΔS modulator receiving an output signal of the phase compensator and converting the output signal to a control code of predetermined bits, a PWM modulator receiving the control code to produce a PWM signal, and an output circuit receiving the PWM signal to drive a voice coil constitute a forward path. A sense amplifier sensing a current of the voice coil, an ADC receiving an output signal of the sense amplifier, a low-pass filter receiving an output signal of the ADC, and a decimation filter receiving an output signal of the low-pass filter constitute a feedback path. An output signal of the decimation filter is fed back to the input side of the phase compensator to form a major feedback loop having a first-order characteristic loop gain. An output signal of the decimation filter is fed back to the output side of the phase compensator to form a minor feedback loop having a loop gain which is flat until a target band frequency when viewed from the output side of the phase compensator.

9 Claims, 15 Drawing Sheets

IN THE CASE OF QM=6, M=7

IN THE CASE OF QM=6, M=7

VCM DRIVER AND PWM AMPLIFIER

CROSS-REFERENCE TO RELATED APPLICATION

The present application claims priority from Japanese patent application No. 2007-243662 filed on Sep. 20, 2007, the content of which is hereby incorporated by reference into this application.

BACKGROUND OF THE INVENTION

The present invention relates to a voice coil motor (VCM) driver and a pulse width modulation (PWM) amplifier, and in particular to a technology effectively applied to a VCM driver and a PWM amplifier used for, for example, a hard disk memory device.

In a hard disk drive device, seek-time needed for movement between tracks tends to be shortened from the viewpoint of high speed access. As a result of this, the drive current of a voice coil motor (VCM) has increased and heat generation at a seek operation has become a problem. In order to solve this heat generation problem, the power consumption is reduced by pulse width modulation (PWM) drive only in the seek period of time when accurate positioning control is not required but power consumption is large. On the other hand, at the time of track following when the magnetic head is allowed to follow a required track for read and write, high-precision control is required for accurate tracking and the influence of a noise caused by PWM drive should be avoided, so that linear drive is used instead of PWM drive. An example of a VCM driver using such a PWM/linear combination method is disclosed in Japanese Patent Laid-Open No. 2002-184137 (Patent Document 1). Furthermore, an example of a VCM driver entirely using PWM drive is disclosed in Japanese Patent Laid-Open No. 2005-304095 (Patent Document 2) and Japanese Patent Laid-Open No. 2005-304096 (Patent Document 3). All of them have been proposed by the present inventors.

SUMMARY OF THE INVENTION

The recording density of a hard disk tends to be further increased by adopting a vertical recording method or the like in order to increase the storage capacity per unit area of the hard disk. When the recording density is increased like this, the track interval is reduced and the accurate tracking thus becomes difficult in the PWM method. For example, also in linear operation by a PWM/linear combination method shown in Patent Document 1, a digital-to-analog converter (DAC) converting a drive current value set at a digital value to an analog value is provided and a VCM driver is driven with the output value of the DAC. At that time, also in a liner method shown in Patent Document 1, a quantization noise, a 1/f noise, or a white noise which arises at digital-to-analog conversion becomes a large obstacle at a track following time when the magnetic head is allowed to follow a required track for read and write.

In the VCM driver of Patent Document 2 or 3, PWM drive is entirely adopted by devising methods of (1) using a current amplifier with a phase compensator realized by a digital filter, (2) reducing a quantization error caused by PWM modulation of an output by $\Delta S$ modulation, (3) reducing a switching error by measuring the delay time and transition time of a switching waveform of an output stage, and (4) reducing a PWM modulation error of an output stage by measuring the power supply voltage of the output stage with the ADC. In this case, a noise generated by the DAC and a noise caused by the phase compensator of the VCM driver are reduced. However, a high recording density corresponding to a vertical recording method or the like as described above causes the following problems.

In the PWM amplifier of Patent Document 2, a control dead band arises near a zero-crossing point of a coil current by a dead time of the output switching circuit, thus causing a large noise (occurrence of a zero-crossing distortion). As a result of this, accurate tracking becomes impossible and the output distortion becomes large for the PWM amplifier. Furthermore, an ADC is necessary to correct an output error (PWM error) to a power supply variation, thereby increasing the cost. The update rate of an input signal is not synchronized with the update rate of the output-side $\Delta S$ modulator and there is little frequency difference between them, so that the generation of a beat noise is feared. A control band is restricted by a delay caused by an LPF or decimation filter subsequent to a $\Delta S$ ADC, so that it is difficult to achieve a control band desired by a hard disk drive (HDD) using a vertical recording method.

An object of the present invention is to provide a VCM driver realizing low power consumption and high accuracy. Another object of the present invention is to provide a PWM amplifier reducing a dead time distortion and suitable for a VCM driver and the like. The above and further objects and novel features of the present invention will be apparent from the following description of this specification and the accompanying drawings.

An embodiment of the present invention is as follows. A VCM driver produces a drive current of a voice coil motor for position control of a magnetic head with a forward path and a feedback path. The forward path includes a digital operation type phase compensator receiving an input signal, a $\Delta S$ modulator receiving an output signal of the phase compensator and converting the output signal to a control code of predetermined bits, a PWM modulator receiving the control code converted by the $\Delta S$ modulator to produce a PWM signal, and an output circuit receiving the PWM signal produced by the PWM modulator to drive a voice coil. The feedback path includes a sense amplifier sensing a current flowing in the voice coil, an ADC receiving an output signal of the sense amplifier, a first low-pass filter receiving an output signal of the ADC, and a first decimation filter receiving an output signal of the first low-pass filter. An output signal of the decimation filter is fed back to the input side of the phase compensator to form a major feedback loop having a first-order characteristic loop gain. An output signal of the decimation filter is fed back to the output side of the phase compensator to form a minor feedback loop having a loop gain which is flat until a target band frequency when viewed from the output side of the phase compensator. Another embodiment of the present invention is as follows. A PWM drive circuit receives a PWM input signal to produce a first drive pulse and a second drive pulse each having a dead time. A first output element receives the first drive pulse to output a first output voltage to an output terminal. A second output element receives the second drive pulse to output a second output voltage to the output terminal. A dead time compensation circuit detects an error pulse between the PWM input signal and an output signal produced by a difference potential between the first output element and the second output element corresponding to the PWM input signal and adds the error pulse to a PWM input signal to be input next.

A second-order error suppression characteristic can be obtained at a drive end of a VCM by a negative feedback effect of the minor feedback loop and a negative feedback effect of the major feedback loop, so that both of an error and a zero-crossing distortion at an output stage caused by a power supply variation are reduced and an accurate tracking operation becomes possible. A zero-crossing (dead time) compensation circuit makes accurate tracking possible and is able to improve an output distortion as a PWM amplifier.

DETAILED DESCRIPTION OF THE PREFERRED EMBODIMENTS

Figure 1:
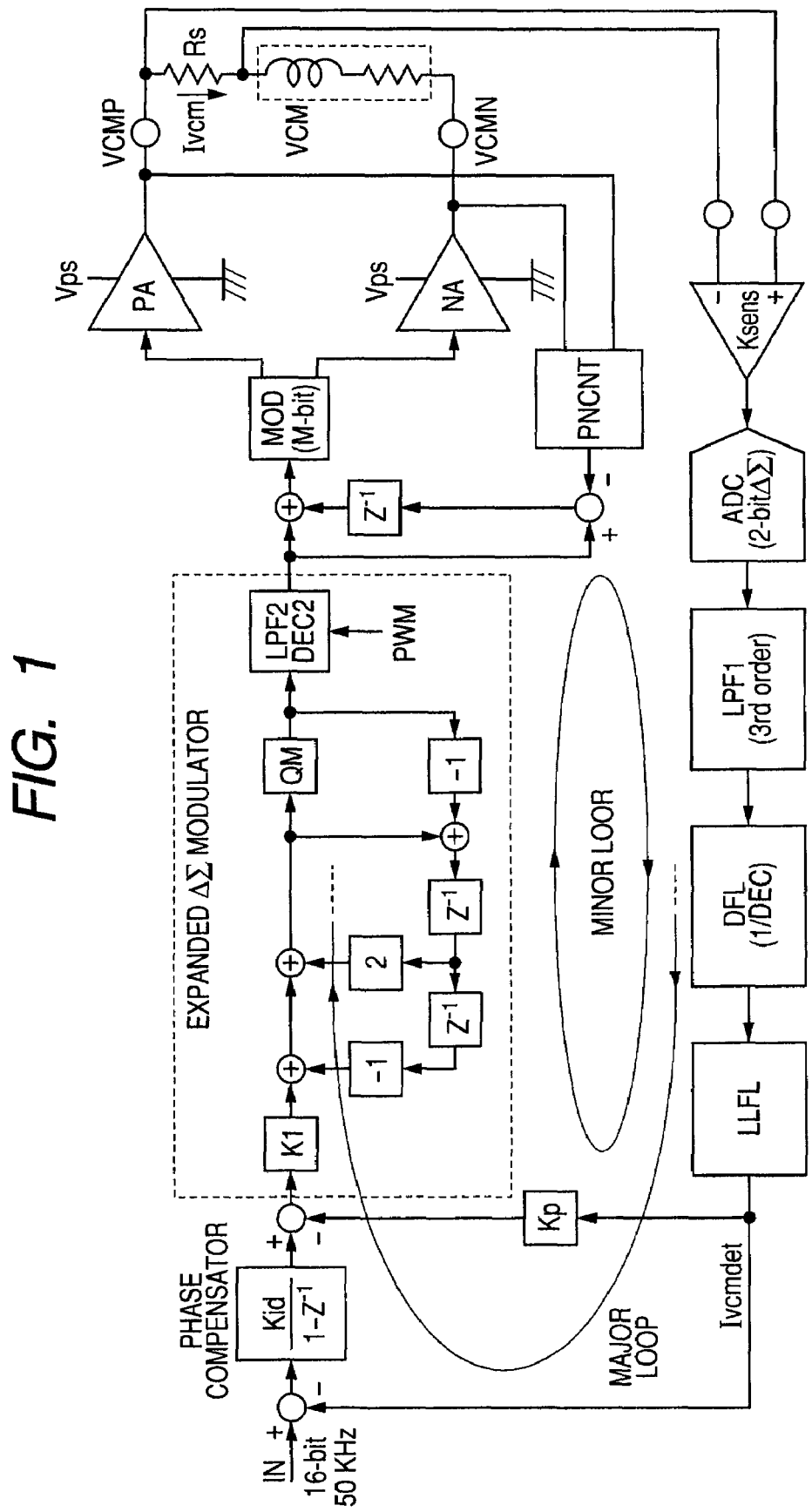
FIG. 1 is a block diagram of an embodiment of a VCM driver according to the present invention.

FIG. 1 is a block diagram of an embodiment of a VCM driver according to the present invention. The VCM driver of FIG. 1 has a forward path for supplying a drive current to a voice coil VCM and a feedback path for sensing the drive current of the voice coil VCM. The forward path includes a phase compensator, an expanded $\Delta\Sigma$ modulator, MOD, PA, and NA. The feedback path includes Ksens, ADC, LPF1, DFL, and LLFL. The MOD is a PWM modulator. The PA and NA are output circuits. The Ksens is a sense amplifier. The LPF1 is a low-pass filter. The DFL is a decimation filter. The LLFL is a lag-lead filter.

The forward path is as follows. An input signal IN is a drive current command, for instance, a 16-bit digital signal. The input signal IN is produced by a controller including a microcomputer described later, and is input to the forward path through a serial input/output port not shown in the figure. The update rate (frequency) of the input signal IN is the order of 50 kHz in a present HDD, while being expected to become higher like 100 kHz in future.

An output of error comparison between the input signal IN (drive current command) and the detection value Ivcmdet of a VCM current which has passed through the feedback path is input to the phase compensator (PI type). An output signal of the PI type phase compensator is input to the expanded $\Delta\Sigma$ modulator. The expanded $\Delta\Sigma$ modulator converts the phase-compensated error comparison output to a control code corresponding to PWM. The PWM modulator MOD receives the control code to produce a PWM pulse. The output circuits PA and NA constitute a bridge circuit and PWM-drives the voice coil VCM coupled to them through the output terminals VCMP and VCMN. In other words, the expanded $\Delta\Sigma$ modulator converts the phase-compensated current value to a control code signal of a predetermined number of bits (e.g. 7 bits). The PWM modulator MOD operates as a D/A converter producing a PWM signal for the output circuits PA and NA on the basis of the control code and a sign-reversed signal thereof.

The feedback path is as follows. To the voice coil VCM, a resistor Rs for current sensing is coupled in series. The resistor Rs converts a VCM current Ivcm to a voltage signal. The sense amplifier Ksens senses the voltage signal converted by the resistor Rs. The output of the sense amplifier is converted to a digital signal by the analog-to-digital converter ADC. The ADC is a $\Delta S$ ADC. The output signal of the ADC is made the detection value Ivcmdet through the low-pass filter LPF1, the decimation filter DFL, and the lag-lead filter LLFL.

Figure 14:
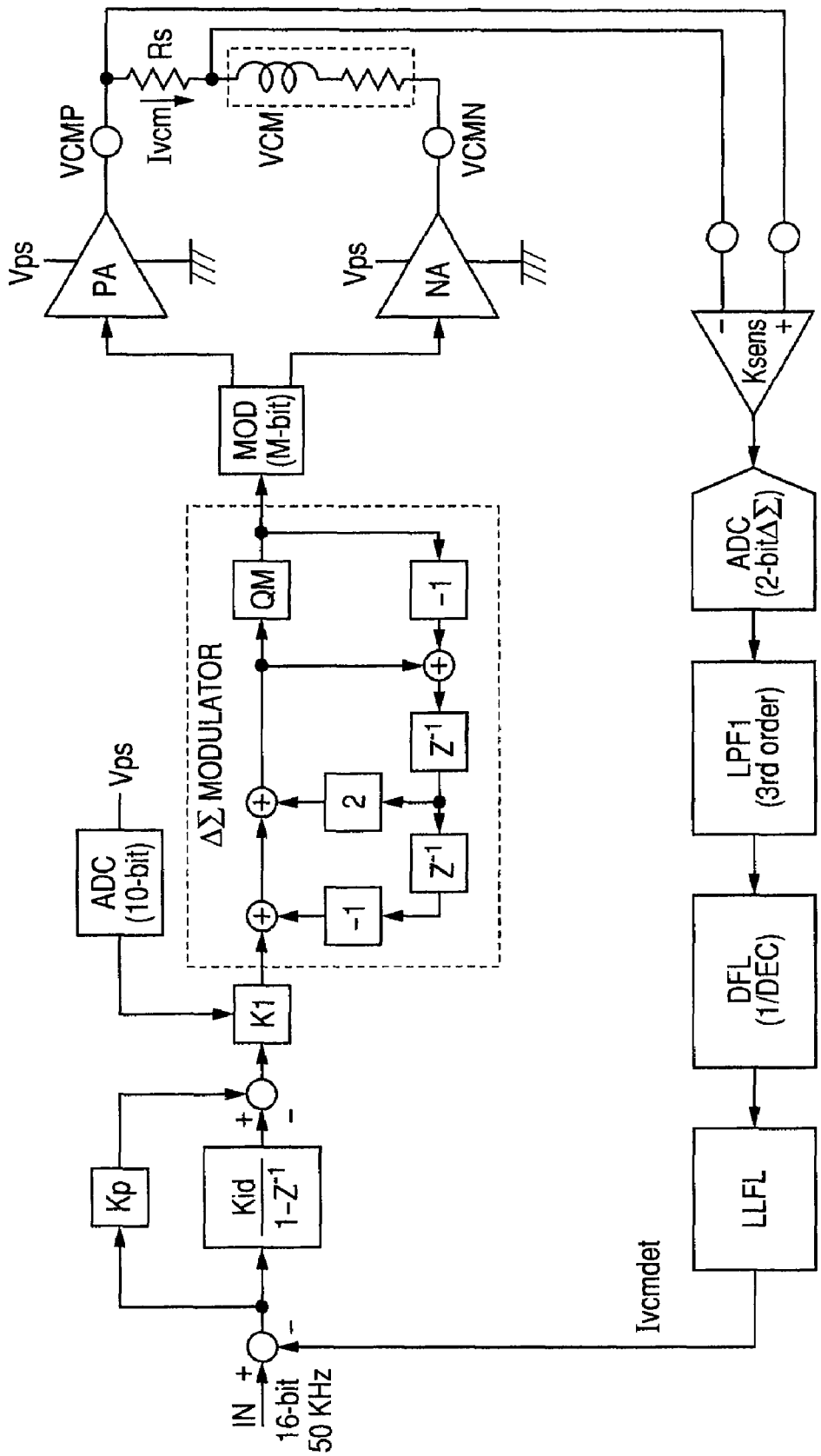
FIG. 14 is a block diagram of a VCM driver using a PWM method examined by the present inventors.

For understanding of the present invention, FIG. 14 shows a block diagram of a VCM driver using a PWM method investigated by the present inventors on the basis of Patent Document 2. Details of it are described in Patent Documents 2 and 3. The forward path of the VCM driver shown in FIG. 14 includes a digital operation type phase compensator, a $\Delta S$ modulator, a PWM modulator MOD, output amplifiers PA and NA, and a voice coil VCM. The feedback path includes a current sense amplifier Ksens, a $\Delta S$ type ADC, an LPF1, a decimation filter DFL, and a lag-lead filter LLFL. For improvement of the line transient characteristic and the PSRR, the ADC is provided to detect the power supply voltage Vps and adjust the gain of the forward path so as not to depend on the power supply voltage Vps.

A first point of difference in configuration between the VCM driver according to the present invention shown in FIG. 1 and the VCM driver of FIG. 14 is that the deriving point of a proportional component compensation for the PI type phase compensator is changed from a point subsequent to error comparison between an input signal IN and the detection value Ivcmdet of a VCM current Ivcm to a point of Ivcmdet output. As a result of this, inside the major loop of FIG. 14 (conventional), a minor loop having a first-order characteristic including an expanded $\Delta\Sigma$ modulator, a PWM modulator MOD, output amplifiers PA and NA, a VCM coil, a current sense amplifier Ksens, a $\Delta S$ type ADC, an LPF1, a decimation filter DFL, a lag-lead filter LLFL, and a constant Kp can be formed.

Figure 2A:
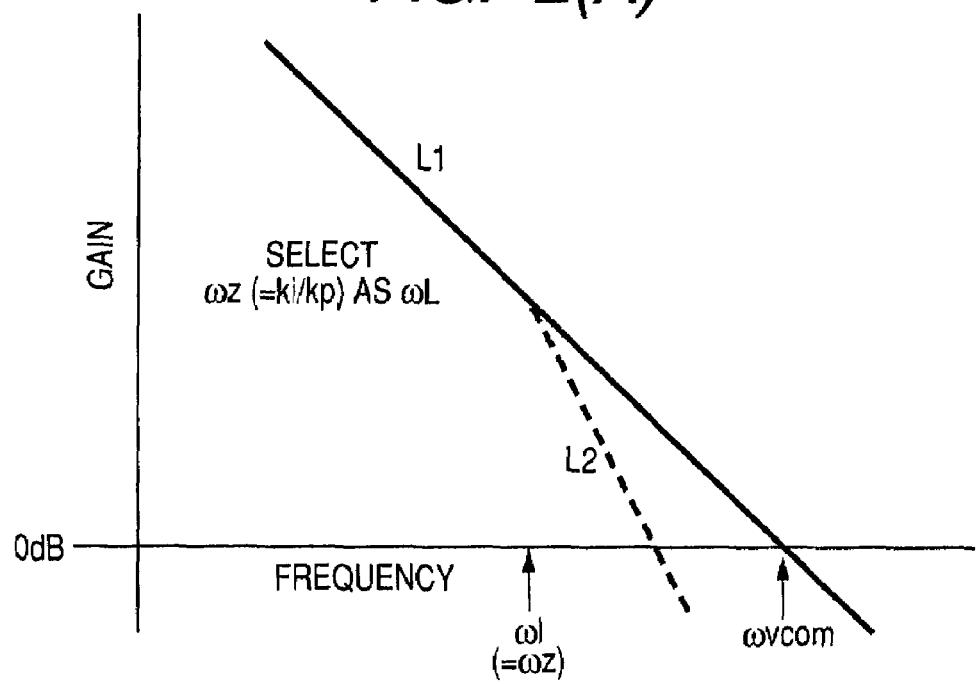
FIGS. 2(A) and 2(B) show loop gain characteristic diagrams for explanation of the present invention.
Figure 2B:
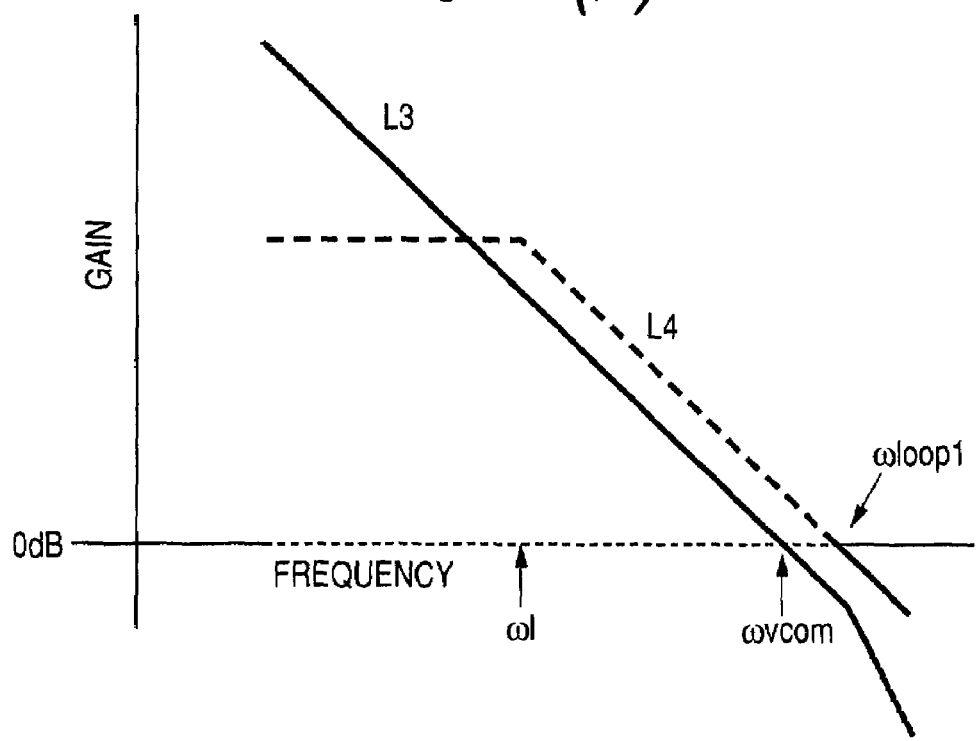

FIGS. 2(A) and 2(B) show loop gain characteristic diagrams for explanation of the present invention. FIG. 2(A) is a loop gain characteristic diagram corresponding to the VCM driver of FIG. 14, and FIG. 2(B) is a loop gain characteristic diagram of the present invention. As shown in FIG. 2(A), the VCM driver of FIG. 14 uses a pole-zero-cancel method and keeps the stability of the system through a single-pole-operation by canceling the pole of the inductor of the voice coil by the zero point of the phase compensator. The entire band is decided with the constant Ki and the zero point is adjusted with Ki/Kp. In other words, a loop gain having a first-order characteristic shown with a solid line L1 is obtained by selecting ωz (=Ki/Kp) so as to match the pole ωl of the inductor shown with a dotted line L2 in FIG. 2(A).

The VCM driver of FIG. 1 uses a minor loop method. The band ωloop1 of the minor loop is made flat until at least a target band frequency ωvcm by the function of Kp as shown in FIG. 2(B). In other words, the loop gain of the minor loop is as shown with a dotted line L4, and the closed-loop gain of the minor loop has a first-order delay characteristic having the band ωloop1. In addition, a single pole operation shown with a dotted line L3 in FIG. 2(B) is obtained by the major loop performing error comparison between an input signal IN and the detection value Ivcmdet of a VCM current Ivcm. The entire system is decided with Kid, and the band ωloop1 of the minor loop is decided with Kp.

Figure 3:
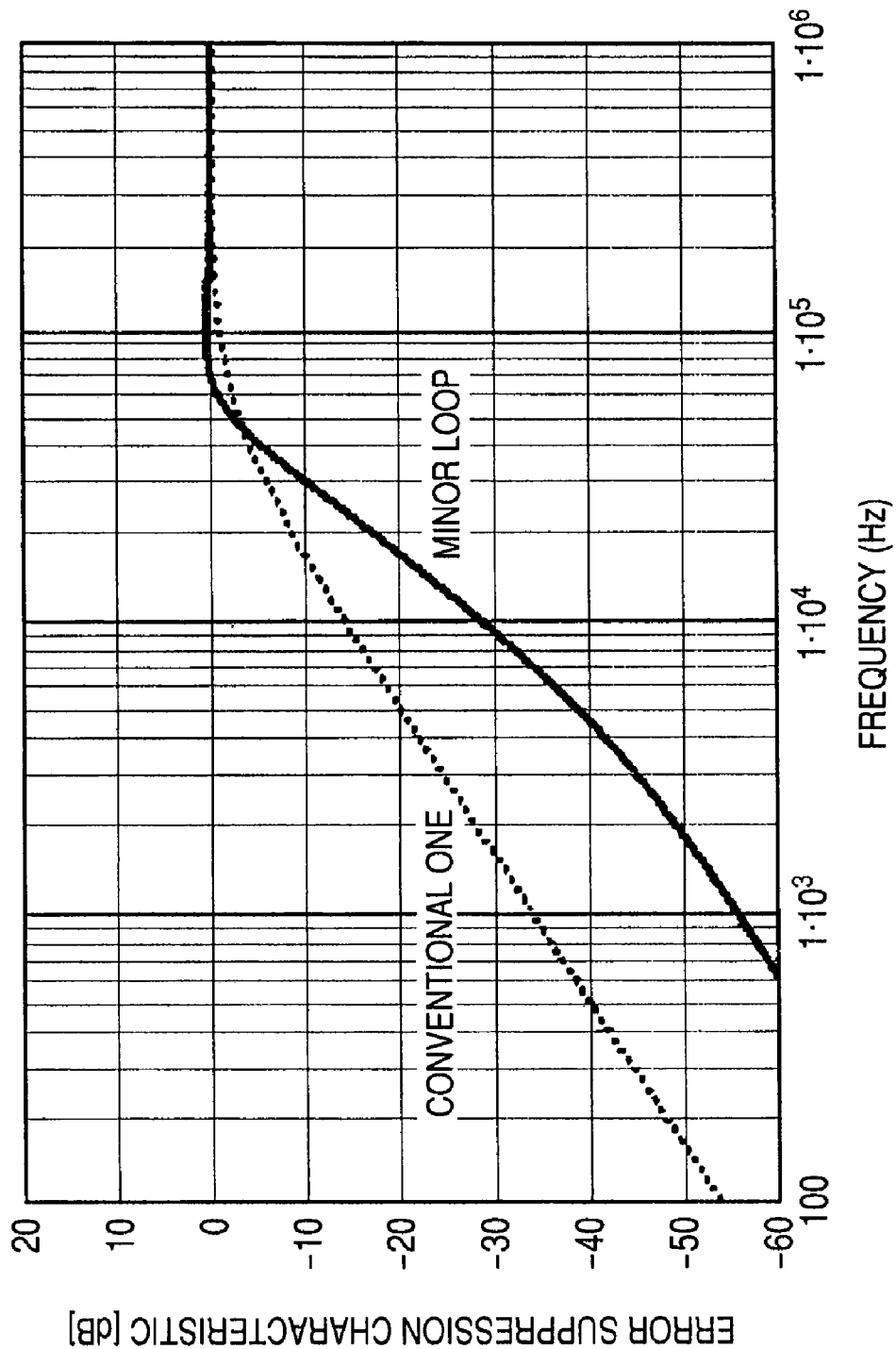
FIG. 3 is an error suppression characteristic diagram for explanation of the present invention.

FIG. 3 is an error suppression characteristic diagram for explanation of the present invention. In FIG. 3, the error suppression characteristic of the VCM driver of FIG. 14 is shown with a dotted line, and the error suppression characteristic of a VCM driver having a minor loop shown in FIG. 1 is shown with a solid line. In an error of an output voltage excluding a quantization error which is unique to a digital system, distortions caused by a variation of the power supply voltage Vps and dead times of the output circuits PA and NA are main components, which arise inside the minor loop. Because of this, the suppression characteristic for the error voltage can be significantly improved from the error suppression characteristic of the VCM driver of FIG. 14 by the minor loop method having a second-order characteristic.

Figure 15A:
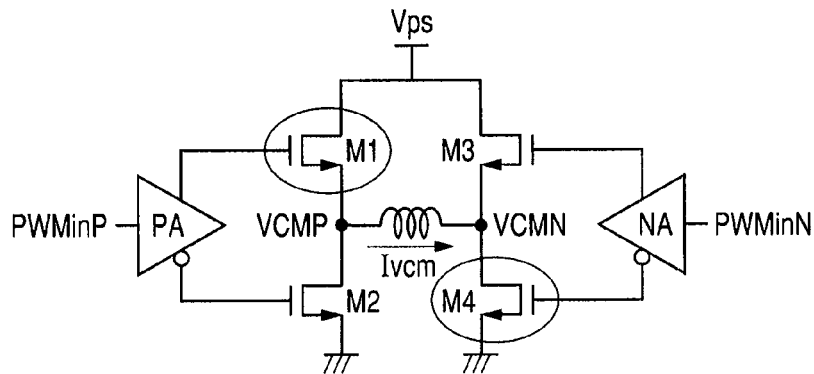
FIGS. 15(A) and 15(B) illustrate an output circuit used in the present invention.
Figure 15B:
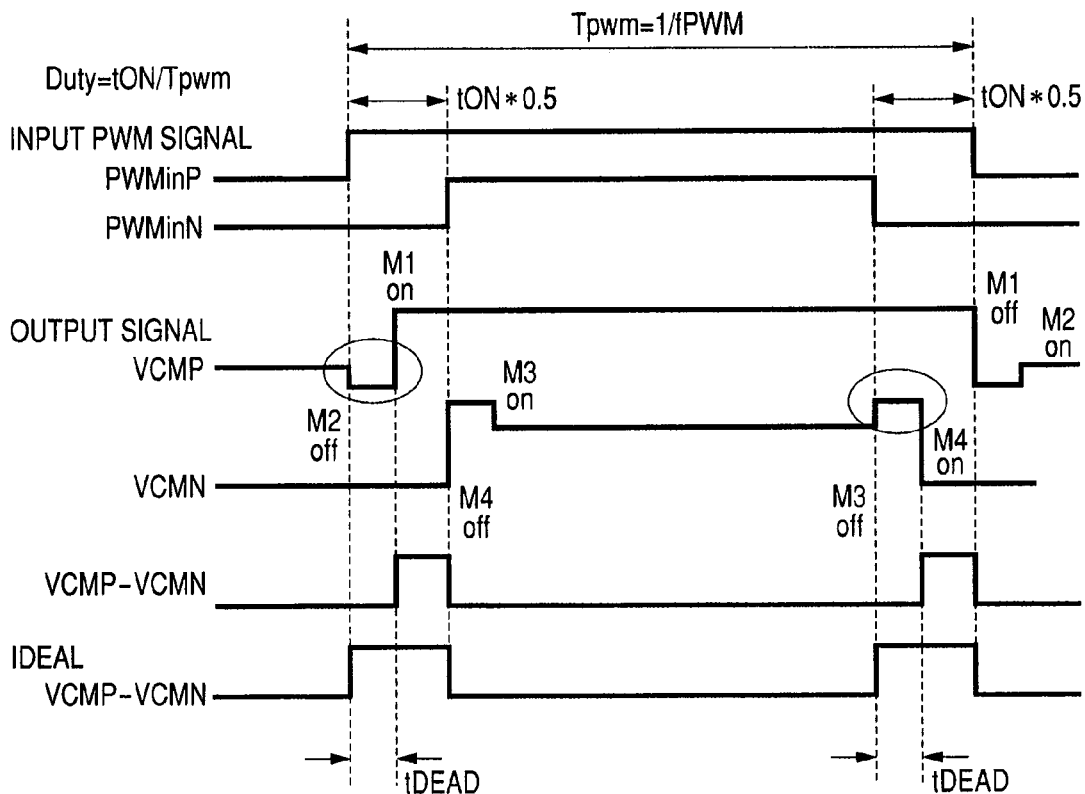

The second difference in configuration is that a zero-crossing compensation circuit PNCNT for the output circuits PA and NA is added. The output circuits PA and NA constitute an H bridge circuit as shown in FIG. 15(A). As shown in FIG. 15(B), a dead time tDEAD is provided in input PWM signals PWMinP and PWMinN so that an upper arm (MOSFET M1) and a lower arm (MOSFET M2) are not turned on at the same time. This can be similarly said for the relation between a MOSFET M3 and a MOSFET M4. For this reason, the pulse widths of the outputs VCMP and VCMN of the output amplifiers PA and NA have errors to the PWM pulse width of an input. The errors appear as amounts of offset of control, which are reversed when the polarity of the coil current Ivcm changes, so that the outputs have a control dead band like the PWM mode characteristic shown with a solid line in FIG. 16 and thereby accurate head position control becomes difficult.

Figure 4:
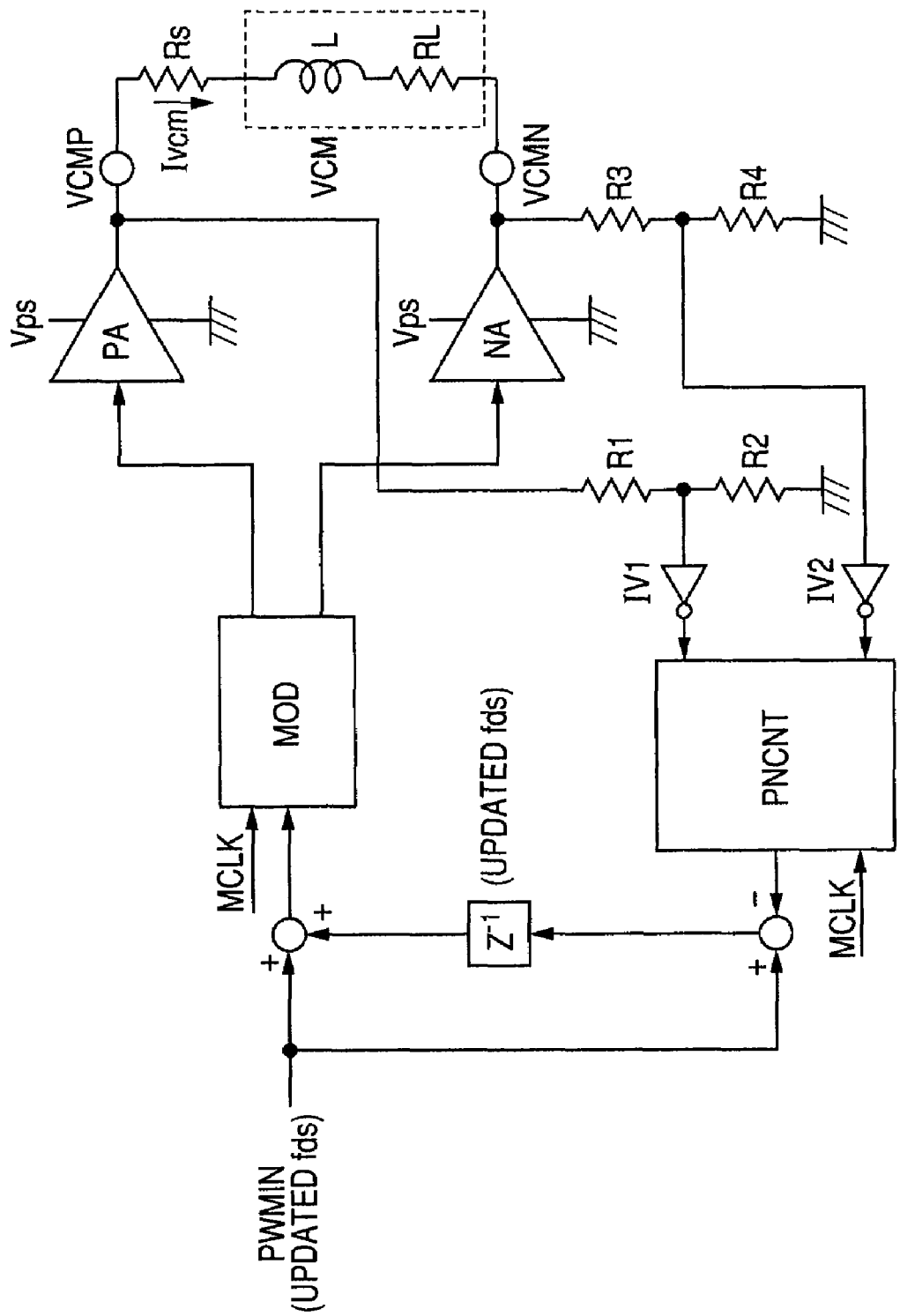
FIG. 4 is a block diagram of an embodiment of a zero-crossing compensation circuit according to the present invention.

FIG. 4 is a block diagram of an embodiment of a zero-crossing compensation circuit according to the present invention. The zero-crossing compensation circuit compensates the control dead band of the PWM mode characteristic. The zero-crossing compensation circuit PNCNT is, so to speak, a first-order Δ-Σ modulation type error correction circuit. Since the output circuits PA and NA have a dead time, the pulse widths of the outputs VCMP and VCMN of the output circuits PA and NA have errors to the pulse width of an input. For this reason, the voltages of the output signals VCMP and VCMN are divided by resistors R1 and R2 and resistors R3 and R4, and the polarities of the voltages are determined by inverter circuits IV1 and IV2, and are counted using a reference clock MCLK by the polarity counter PNCNT. The difference between the counter output and the PWMIN (control code) is added to an updated control code (PWMIN) in the next cycle to compensate the zero-crossing error.

Figure 16:
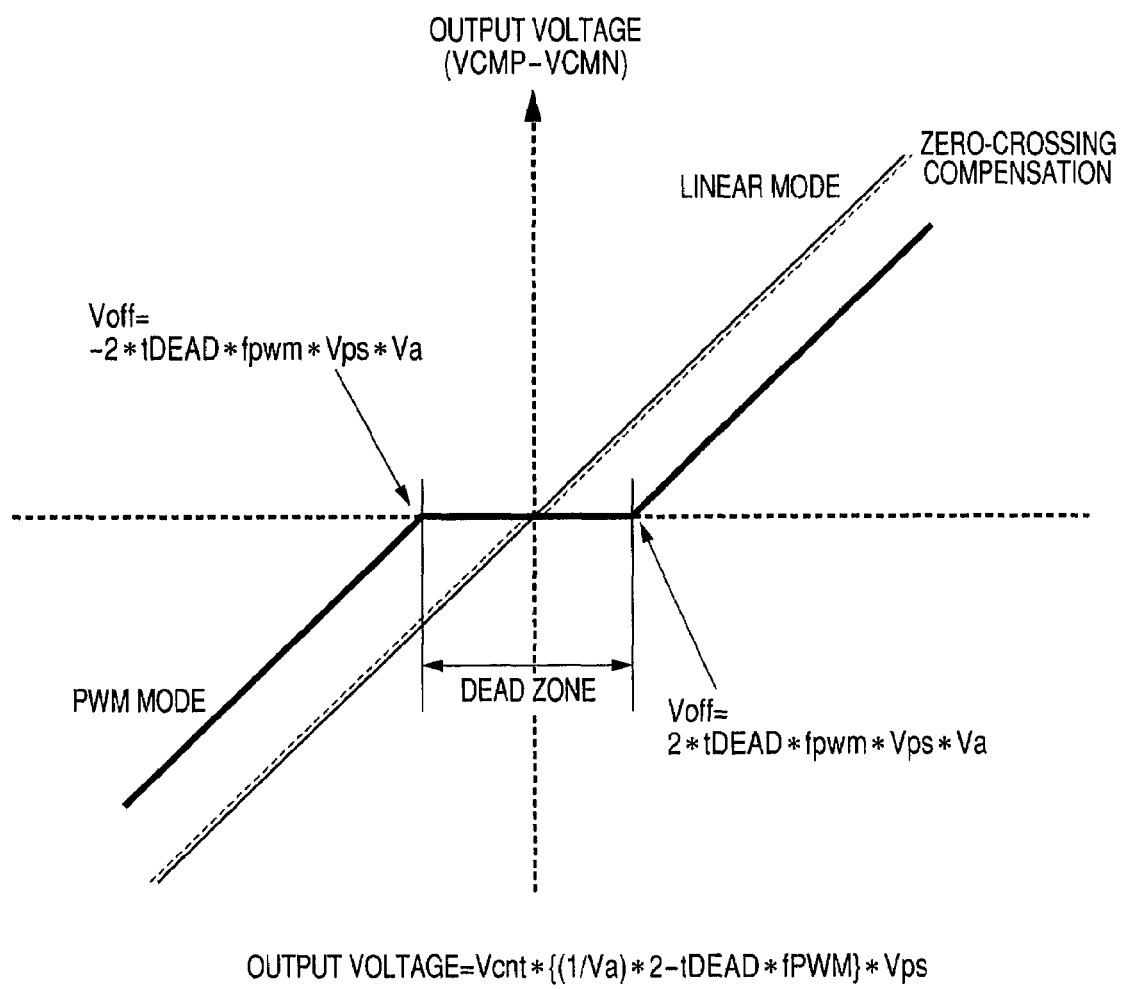
FIG. 16 is a transmission characteristic diagram of an output circuit for explanation of the present invention.

Like this, the measuring times of the output pulses (VCMP and VCMN) and the error time of the indicated value PWMIN of the PWM control are added to the next input signal of the PWM modulator to correct it after one PWM update cycle delay. As a result of this, the error (zero-crossing distortion) caused by the dead times of the output amplifiers PA and NA is reduced as shown with a dotted line in FIG. 16. In FIG. 16, a thin solid line is a linear mode characteristic. As shown in FIG. 16, first-order ΔΣ type correction by which an error correction amount is added to an input signal after one PWM update cycle delay is effective in terms of oscillation, because second-order or higher ΔΣ type correction causes an oscillation operation when the error is large.

The third difference in configuration is that the low-pass filter LPF2 and the decimation filter DEC2 are added after the ΔΣ modulator on the forward path in FIG. 1 to allow the ΔΣ modulator to operate with a higher operation clock. In the configuration of FIG. 14, the PWM frequency and the operation speed (update rate) fds of the ΔΣ modulator are limited as fds=fpwm from the viewpoint of the control of occurrence of an aliasing distortion. By the configuration of the present invention, the operation speed of the ΔΣ modulator can be increased and the quantization error arising on the forward path can be reduced. Since increase in the operating frequency of the ΔΣ modulator causes reduction in the decimation ratio of the feedback path, the cut-off frequency of the low-pass filter LPF1 on the feedback path can be set high and the delay time can be thus shortened. In this case, it is feared that the high frequency noise increases as the cut-off frequency of the low-pass filter LPF1 on the feedback path increases. However, the configuration of the present invention includes the low-pass filter LPF1 on the feedback path and the low-pass filter LPF2 on the forward path, so that the high frequency noise does not so much increase as compared with the configuration (having a low-pass filter LPF1 only on the feedback path) of FIG. 14.

The loop gain of the minor loop has a first-order LPF characteristic having a breaking point ωl in the coil impedance. The constant Kp is selected appropriately and the band ωloop1 of the minor loop is set at a required value. The band ωloop1 should usually be selected to be a value that is several times higher than the VCM band ωvcm. Furthermore, the higher the band ωloop1, the more the error suppression characteristic is advantageous, and the VCM band ωvcm can also be increased, so that the shorter the in-loop delay time of the minor loop, the better it is. The in-loop delay time can be improved by the third difference in configuration.

Figure 5:
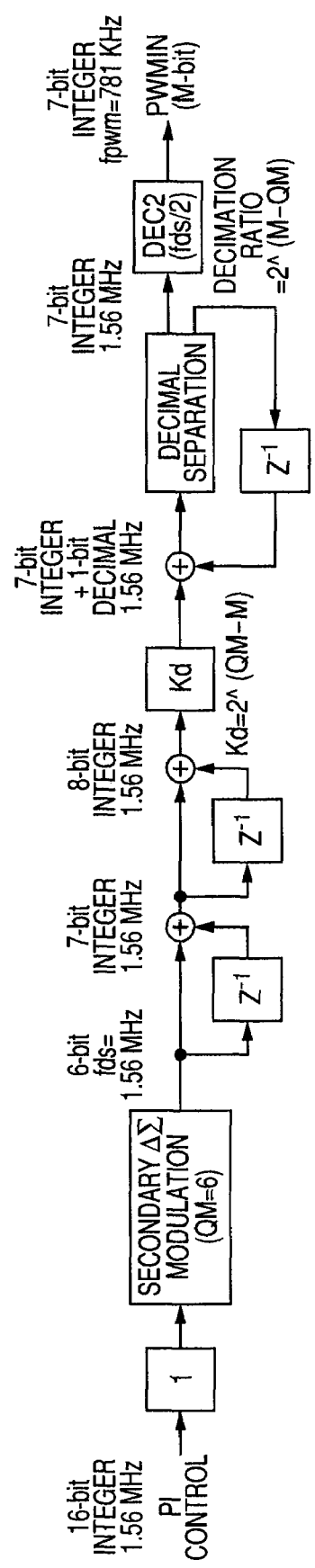
FIG. 5 is a block diagram of an embodiment of an expanded $\Delta\Sigma$ modulator.

FIG. 5 is a block diagram of an embodiment of an expanded ΔΣ modulator. In this embodiment, a decimal point appears in the output of a second-order LPF subsequent to a second-order ΔΣ modulator, and is corrected by a decimal separation, a delay stage ($Z^{-1}$), and an adder. In this embodiment, the number of bits (QM) of the ΔΣ modulator is six, and the number of bits (M) of the PWM modulator is seven. As shown in FIG. 5, this embodiment has an advantage that the hardware can be simplified because the second-order LPF can be realized using two adding filters.

Figure 6:
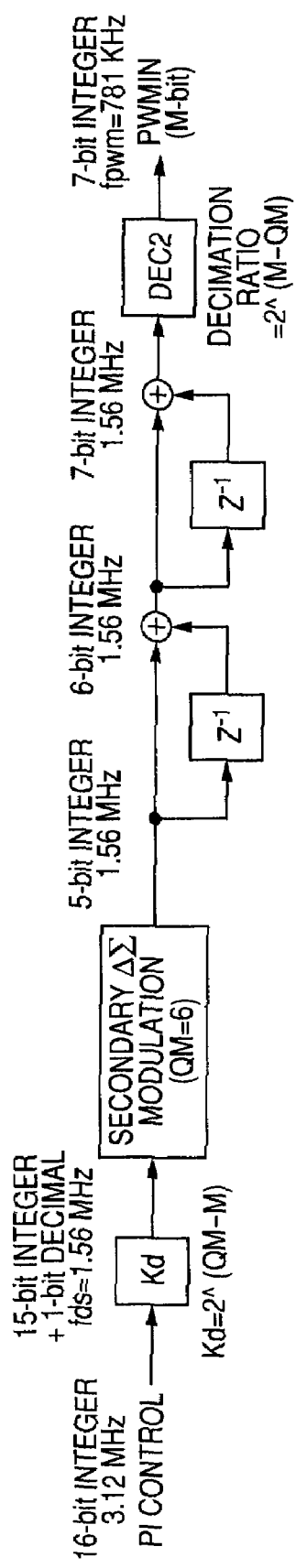
FIG. 6 is a block diagram of another embodiment of an expanded $\Delta\Sigma$ modulator.

FIG. 6 is a block diagram of another embodiment of an expanded ΔΣ modulator. In this embodiment, gain adjustment is preliminary performed so that no decimal point appears in the output of a second-order LPF. In this embodiment, the number of bits (QM) of the ΔΣ modulator is six, and the number of bits (M) of the PWM modulator is seven. Like the embodiment of FIG. 5, this embodiment has an advantage that the hardware can be simplified because the second-order LPF can be realized using two adding filters. In addition, in this embodiment, the hardware can be more simplified than the embodiment of FIG. 5 because this embodiment can be realized with only integer operations by performing suitable scaling before the ΔΣ modulator.

Figure 7:
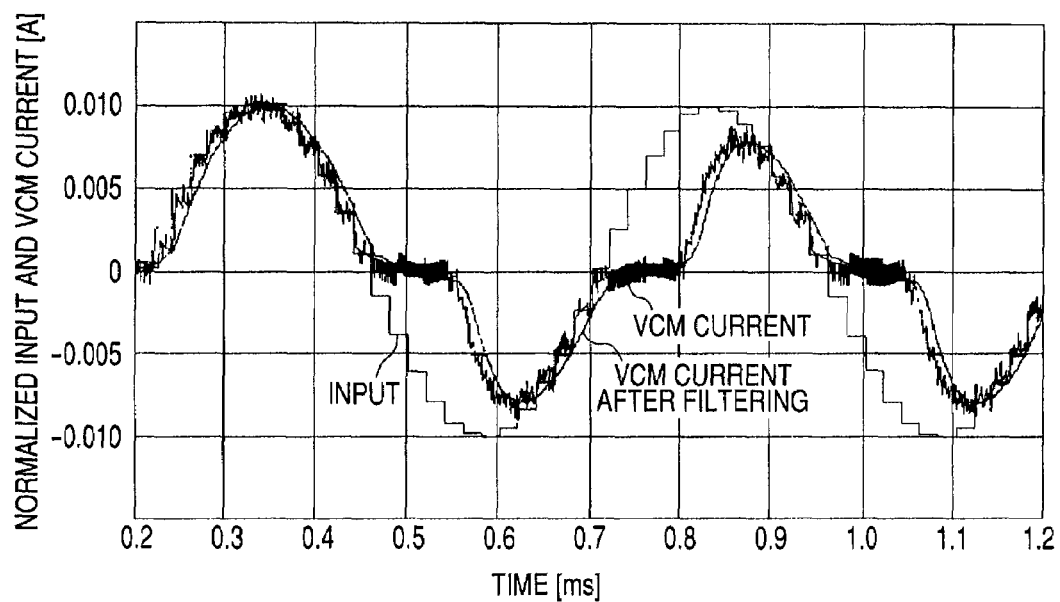
FIG. 7 is a simulation waveform diagram corresponding to a VCM driver of FIG. 14.

FIGS. 7 to 10 are simulation waveform diagrams for explanation of the present invention. FIG. 7 is a waveform diagram corresponding to the VCM driver of FIG. 14, in which the input signal is equivalent to 2 kHz/10 mA. When the input signal has changed from the positive side to the negative side, a large zero-crossing distortion arises in falling waveforms to the negative side of a VCM current and a VCM current after filtering. In contrast, when the input signal has changed from the negative side to the positive side, a large zero-crossing distortion arises in rising waveforms to the positive side of a VCM current and a VCM current after filtering.

Figure 8:
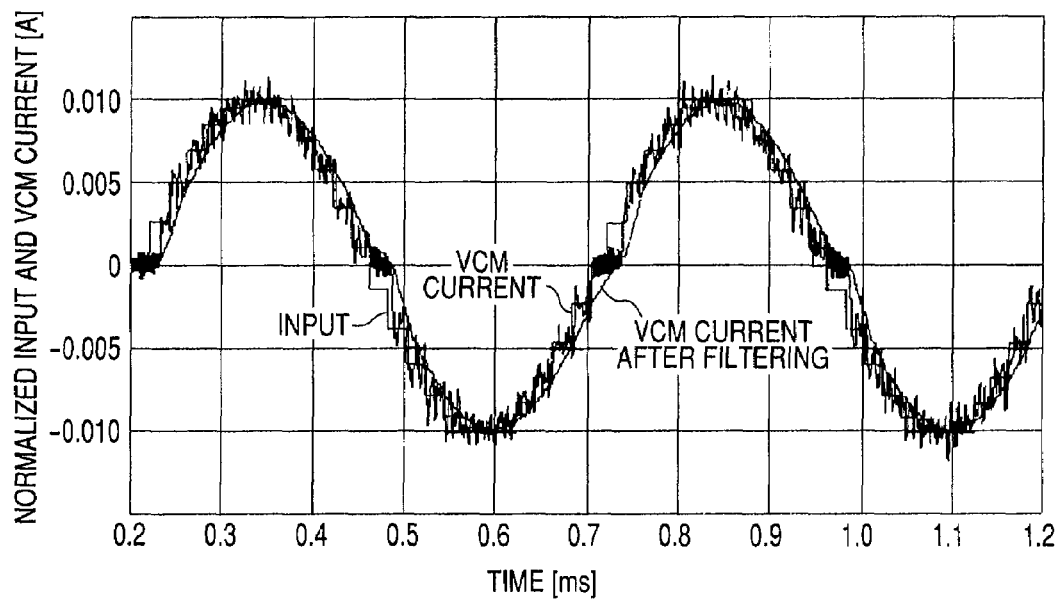
FIG. 8 is a simulation waveform diagram in the case that the minor loop in FIG. 1 is provided.

FIG. 8 is a waveform diagram in the case that the minor loop in FIG. 1 is provided, in which the input signal is equivalent to 2 kHz/10 mA like the above. Zero-crossing distortions in a VCM current and a VCM current after filtering which arise when the input signal has changed from the positive side to the negative side or when the input signal has changed from the negative side to the positive side are significantly improved as compared with those in FIG. 7 by addition of the minor loop.

Figure 9:
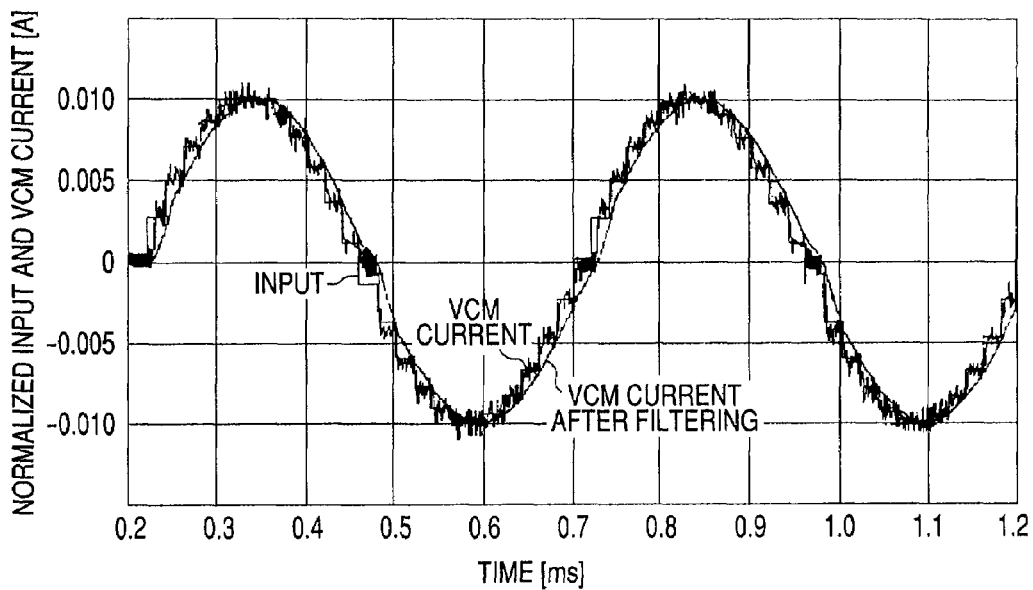
FIG. 9 is a simulation waveform diagram in the case that the zero-crossing compensation circuit in FIG. 1 is provided.

FIG. 9 is a waveform diagram in the case that the zero-crossing compensation circuit in FIG. 1 is provided, in which the input signal is equivalent to 2 kHz/10 mA like the above. Zero-crossing distortions in a VCM current and a VCM current after filtering which arise when the input signal has changed from the positive side to the negative side or when the input signal has changed from the negative side to the positive side are significantly improved as compared with those in FIG. 7 by addition of the minor loop.

Figure 10:
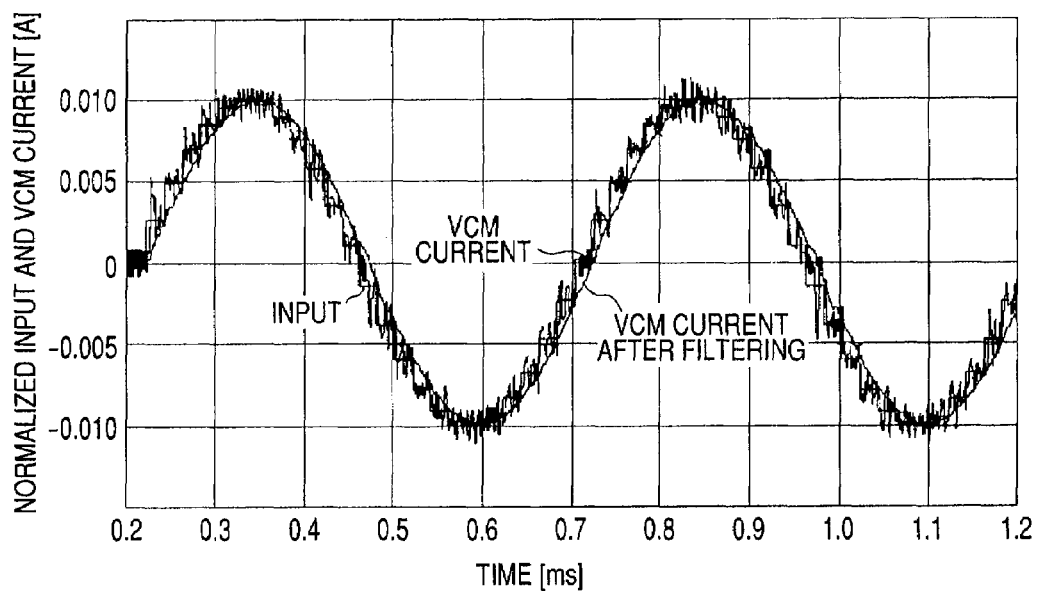
FIG. 10 is a simulation waveform diagram in the case that the minor loop and the zero-crossing compensation circuit in FIG. 1 are provided.

FIG. 10 is a waveform diagram in the case that the minor loop and the zero-crossing compensation circuit in FIG. 1 are provided, in which the input signal is equivalent to 2 kHz/10 mA like the above. Zero-crossing distortions in a VCM current and a VCM current after filtering which arise when the input signal has changed from the positive side to the negative side or when the input signal has changed from the negative side to the positive side are improved as compared with those in FIGS. 8 and 9 by addition of the minor loop and the zero-crossing compensation circuit.

Figure 11:
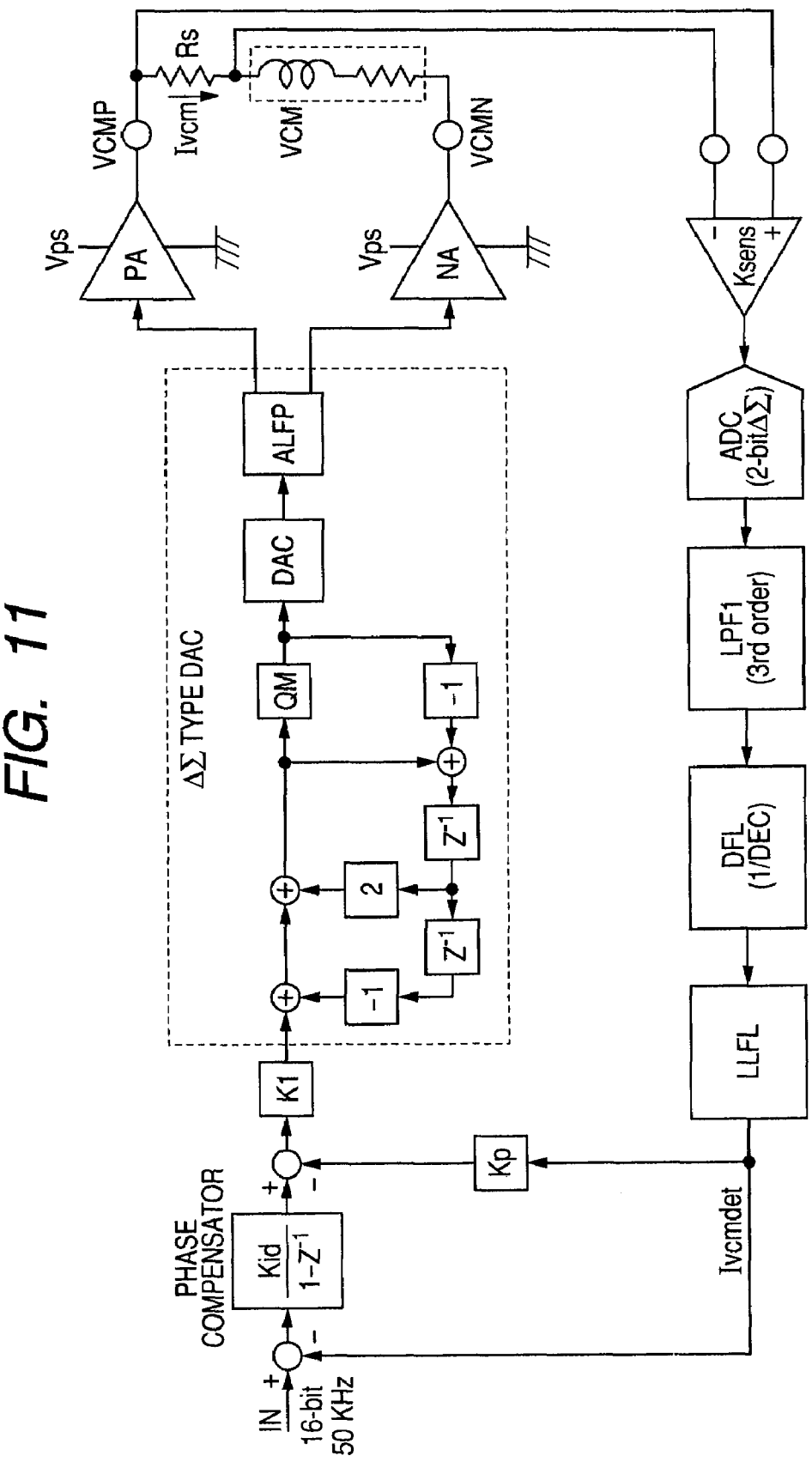
FIG. 11 is a block diagram of another embodiment of a VCM driver according to the present invention.

FIG. 11 is a block diagram of another embodiment of a VCM driver according to the present invention. In this embodiment, a voice coil VCM is driven linearly. This embodiment is different from the embodiment shown in FIG. 1 in that the expanded ΔΣ modulator and the PWM modulator on the forward path are replaced with a ΔS type DAC consisting of a ΔS modulator, a DAC, and an ALPF to drive the voice coil VCM linearly. The DAC is a digital-to-analog converter. 18 The ALPF is an analog low-pass filter. As a result of this, the quantization error in the PWM modulator MOD can be reduced, and the zero-crossing distortion can also be reduced by adopting class AB power amplifiers PA and NA in the case of linear drive, so that the SN ratio can be improved as compared with the VCM driver shown in FIG. 1.

Figure 12:
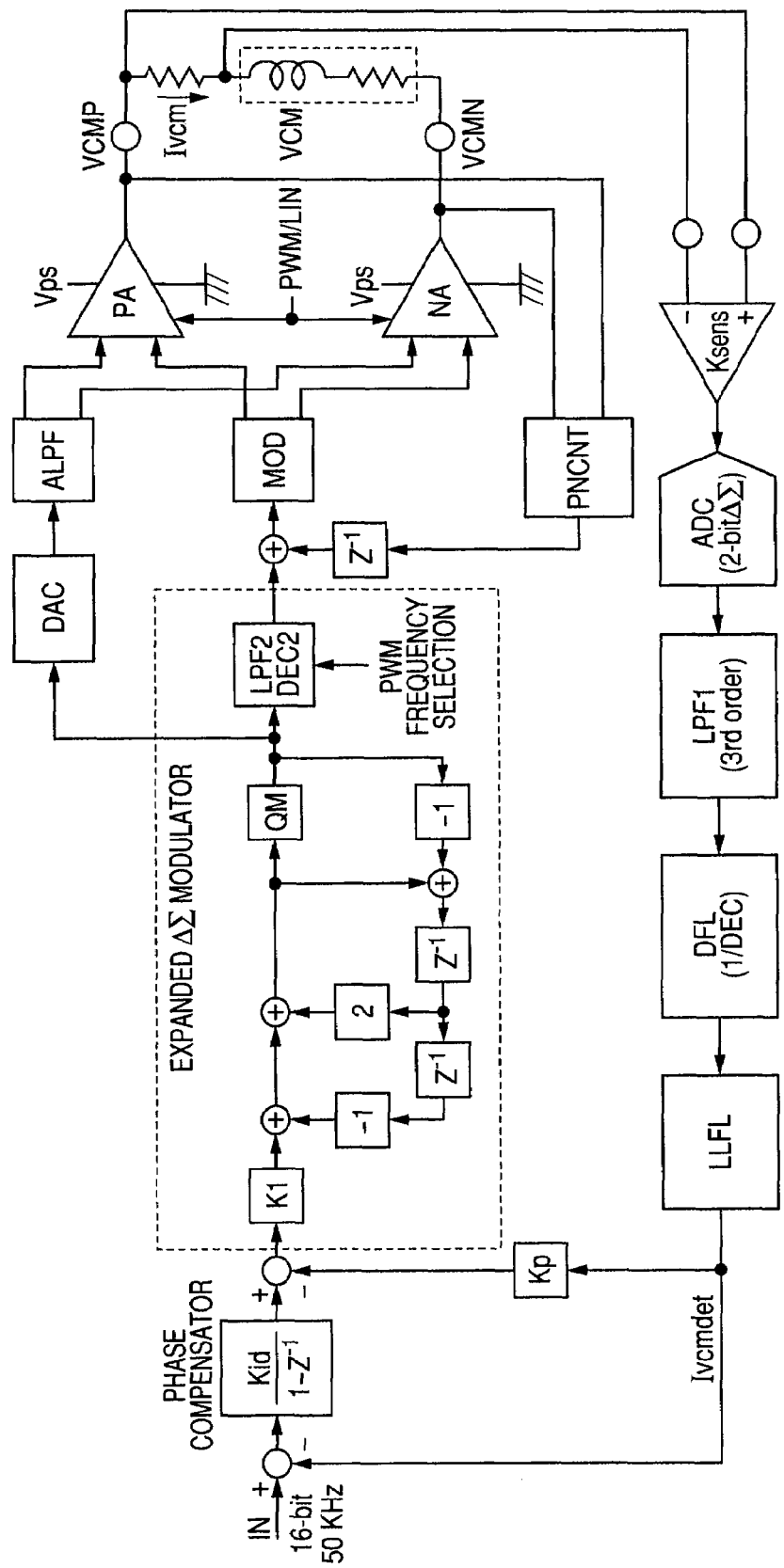
FIG. 12 is a block diagram of another embodiment of a VCM driver according to the present invention.

FIG. 12 is a block diagram of another embodiment of a VCM driver according to the present invention. In this embodiment, the PWM method shown in FIG. 1 and the linear method shown in FIG. 11 are used alternately. The expanded ΔΣ modulator and the PWM modulator shown in FIG. 1 are almost equivalent to the ΔS type DAC in terms of configuration, and are only different from it in configuration between the output of the ΔS modulator and the inputs of the power amplifiers. Thus, the combination drive method can be realized without a large increase in cost. In this configuration, the voice coil is operated by the PWM method at a seek operation, and is operated by the linear method at a tracking operation. The signal PWM/LIN is an operation switching signal for the output circuits. At switching between both operation modes, seamless switching between the characteristic (PWM mode with zero-crossing compensation) shown with a dotted line in FIG. 16 and the characteristic (linear mode LIN) shown with a thin solid line in FIG. 16 is required, so that the entire loop transfer function at PWM (zero-crossing compensation) drive should be matched with that at linear drive. Also from this viewpoint, LPF2 is needed after the ΔS modulator on the forward path.

The VCM drivers of FIGS. 1, 11, and 12 are also provided with a serial port for input/output operation between the VCM driver and the controller, a circuit of estimating a back electromotive voltage which calculates a back electromotive voltage Vb–emf (estimated value) of the voice coil VCM and supplies it to the controller as speed information, and the like, as described in Patent Documents 2 and 3, although they are omitted in the VCM drivers shown in FIGS. 1, 11, and 12. It is made possible to send the back electromotive voltage Vb–emf calculated by the circuit of estimating a back electromotive voltage to the controller through the serial port. The controller is able to recognize a traveling speed of the head from the back electromotive voltage received, and use it, for example, for speed control of the voice coil motor performed at head loading to move the magnetic head from the retraction position called a ramp to a position over a disk. If the traveling speed of the magnetic head is too high, the magnetic head may come into contact with the surface of the disk to damage the disk. However, it can be prevented by the speed control.

Figure 13:
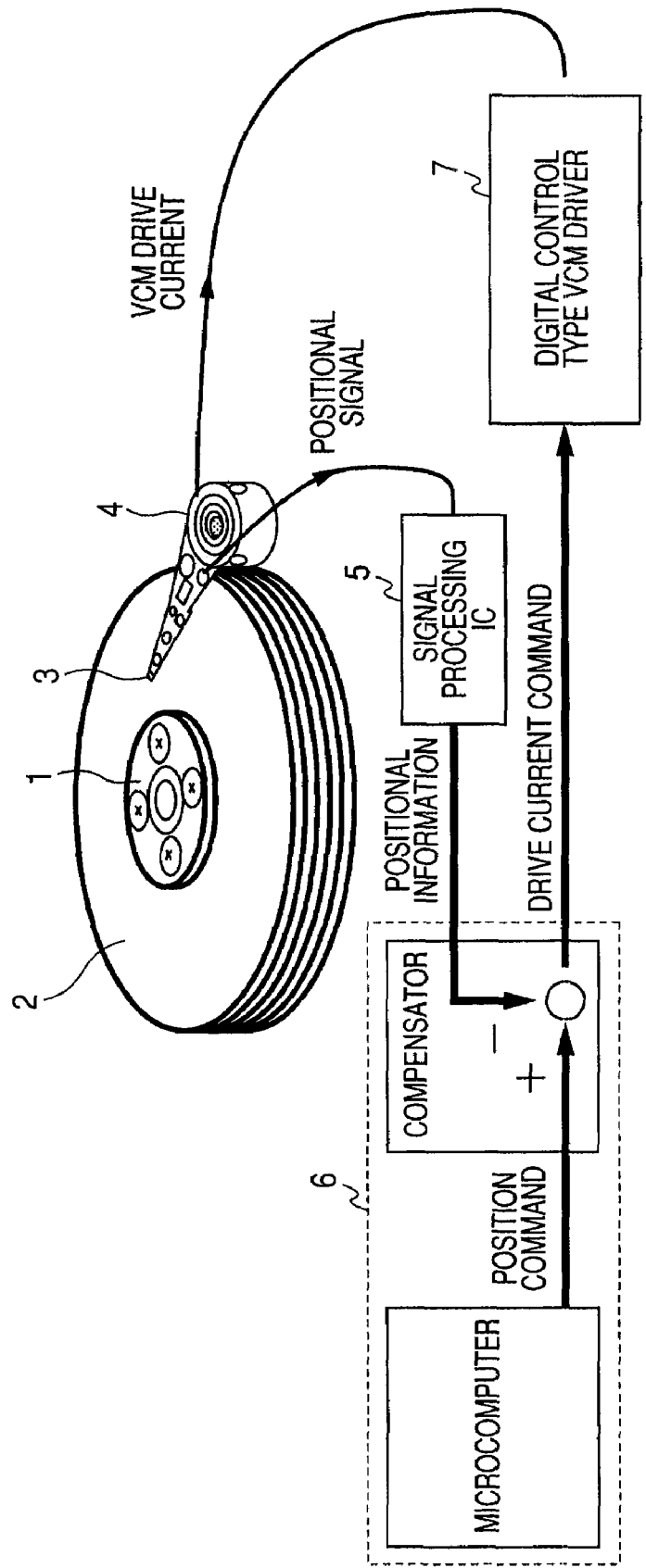
FIG. 13 is a schematic configuration diagram of an embodiment of a magnetic disk device to which the present invention is applied.

FIG. 13 is a schematic configuration diagram of an embodiment of a magnetic disk device to which the present invention is applied. In the hard disk drive (HDD), data is written onto and read from a disk 2 being rotated at a high speed by a spindle motor 1 through a head 3. The HDD uses a voice coil motor (VCM) 4 which is a head actuator changing a storage position (position of the head 3), and performs a feedback control of reading servo information previously stored on the disk 2 with a signal processing IC 5, issuing a drive current command for driving the VCM 4 with a controller 6 including a microcomputer, and driving the VCM 4 with a digital control type VCM driver 7 shown in FIG. 1, 11, or 12. The VCM driver 7 itself, or the VCM driver 7 and other circuits such as a drive control circuit (not shown) of the spindle motor 1, are composed of one semiconductor integrated circuit device. By applying the present invention to a HDD, it can be realized to increase the speeds of the seek operation and tracking operation of the HDD and reduce the power consumption of the HDD.

Figure 17:
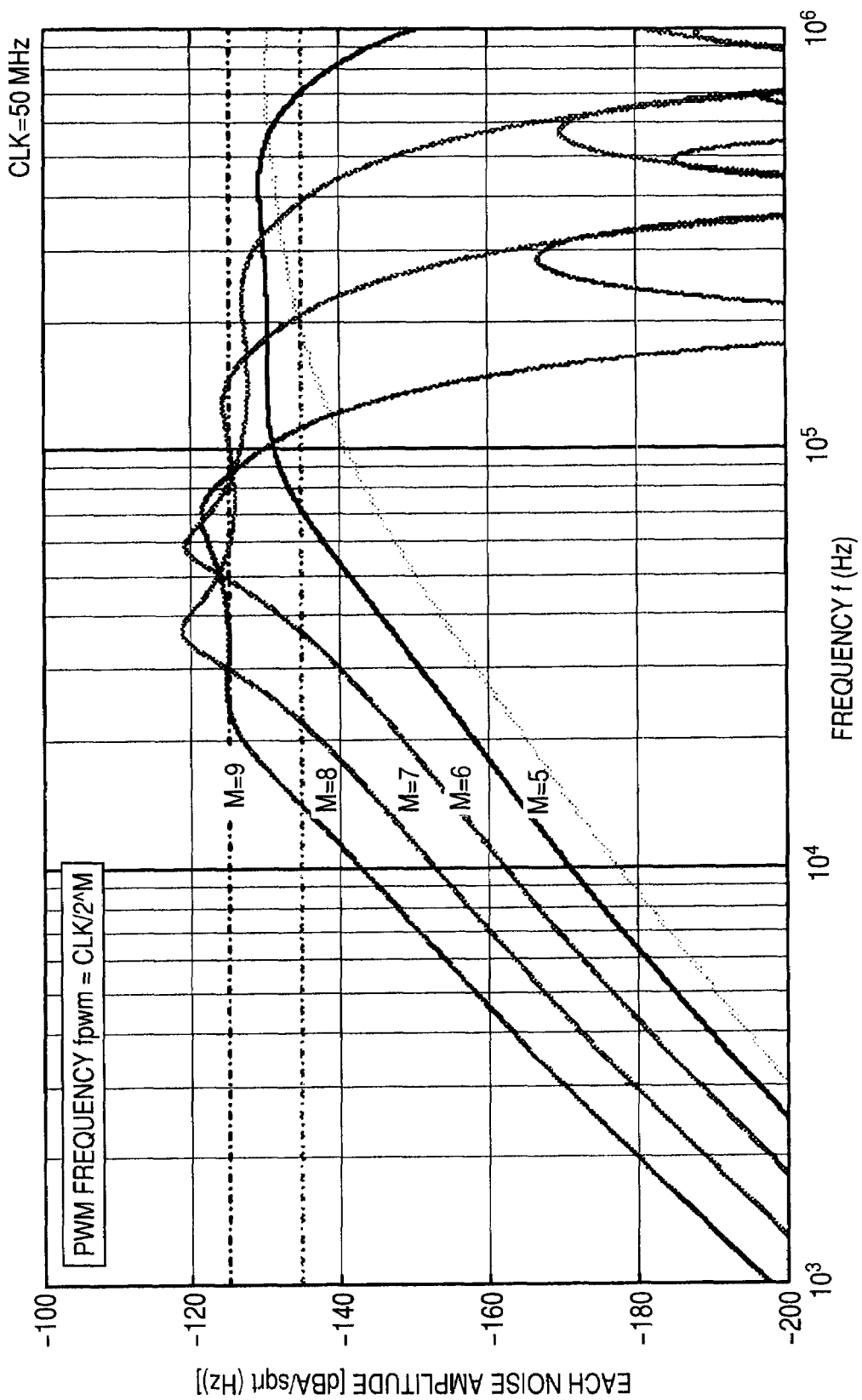
FIG. 17 is a characteristic diagram showing the relation between the PWM frequency and the quantization error for explanation of the present invention.

FIG. 17 is a characteristic diagram showing the relation between the PWM frequency and the quantization error. FIG. 17 shows the relation in the case of second-order ΔS modulation. When the PWM frequency is reduced by one-half in the case of the same clock CLK (50 MHz), the noise is improved by "–15 dB (ΔS modulator)+6 dB (PWM)=–9 dB". M is the number of bits of the modulator MOD. From the relation of "PWM frequency fpwm=CLK/$2^M$", when M is increased to, for example, nine, the PWM frequency fpwm decreases and the update rate increases, so that each noise amplitude increases as shown in FIG. 17. Increase of the noise amplitude causes the deterioration of the accuracy of the position control of the magnetic head. When the frequency of the input signal IN is set to 50 KHz like the above embodiment, the noise amplitude matches the target value shown in FIG. 17 when M is the order of 7 in consideration of noise reduction caused by a feedback loop such as a major loop or a minor loop.

A zero-crossing distortion in the PWM method is a duty error of PWM caused by a dead time, and can be thus reduced by actually measuring and feeding back an error time like the embodiment of FIG. 4. In a high-order ΔS modulator, the degree of S/N improvement associated with the rise in the operating frequency is large. For example, in a second-order ΔS modulator, when the operating frequency rises by twice, the S/N can be improved by 15 dB. Similarly in a multi-bit PWM method using ΔS modulation, the decrement of noise by the increase in the speed of the ΔS modulation is larger than the increment of noise by the reduction in the number of bits of the PWM modulator as shown in FIG. 17. Furthermore, in general, when the PWM frequency rises, the switching loss increases. In other words, the PWM frequency and the noise are in a trade-off relation, and the selection of a PWM frequency is needed. In this case, it is desirable that the characteristic is not changed and only the PWM frequency is changed on the feedback path and up to the ΔS modulator on the forward path.

However, in an operation speed of ΔS modulation higher than the PWM frequency, the noise increases due to an aliasing distortion, so that a low-pass filter (LPF) and a decimation filter which are suitable for the ratio between the PWM frequency and the speed of the ΔS modulator are added after the ΔS modulator in order to prevent the noise increase. In the case of the above embodiment, the feedback path and the forward path have LPF1 and LPF2, respectively, so that it becomes possible to distribute orders to LPF1 and LPF2, a high-order LPF having a short delay time can be realized, the delay time of the loop can be optimized, and the S/N of ΔS modulation of the forward path can also be optimized. Furthermore, when the delay time of the LPF becomes short, the control band can be made wider as compared with the configuration of FIG. 14, and a wide band minor loop feedback can be introduced. In this case, a negative feedback effect of the minor loop and a negative feedback effect of the major loop can be obtained at the same time, so that a second-order error suppression characteristic is obtained as a result, and thereby both of an error and a zero-crossing distortion at an output stage caused by a power supply variation can be reduced. As a result of this, the ADC for correcting the error at the output stage due to the power supply variation can be omitted.

By preparing a path for replacing PWM drive with linear drive like the embodiment of FIG. 11, a noise caused by a quantization error arising at the PWM drive can be reduced. Furthermore, by using a PWM operation and a linear drive path in combination like the embodiment of FIG. 12, it becomes possible to use a power consumption priority operation and a noise priority operation properly, and further improvement of the system performance becomes possible. For example, in the case of a HDD, by using the linear drive at the seeking in which power consumption reduction is important and using the linear drive at the tracking in which accuracy is important, low power consumption and high accuracy VCM drive control becomes possible. In this case, by separating the path between the output of the ΔS modulator and the input of the output circuits PA and NA of the forward path to a linear drive and a PWM control, the cost can be minimized.

A circuit having the configuration shown in FIG. 4 can be widely used as a PWM amplifier which receives a digital value input signal and produces an analog output signal corresponding to the input signal. The circuit can also be used as an audio digital amplifier compensating an output distortion at a dead time in addition to a PWM modulator of a VCM driver like the above embodiment.

Up to this point, the present invention developed by the present inventors has been concretely described based on the embodiments. However, the present invention is not limited to the embodiments and various changes and modifications can be made without departing from the spirit and scope of the present invention. For example, when the characteristics of the sense amplifier are used alternately, there is a case that a variation at switching becomes a problem by the delay time of a low-pass filter on the feedback path. In this case, LPF1, DFL, and LLFL after the ΔS ADC on the feedback path in FIG. 1 may be deleted as appropriate. For example, concrete configurations of concrete circuits realizing the circuit blocks, amplifiers constituting the output circuits PA and NA, and switching circuits added as shown in FIG. 12 may be realized in various embodiments. Furthermore, a voltage negative feedback type circuit which performs negative feedback of both or either of the output voltages during PWM operation to produce a drive voltage may also be used.

The present invention may be widely applied to a VCM driver such as a HDD or the like and a PWM amplifier operated by a digital input signal.

What is claimed is:

1. A VCM driver comprising a forward path and a feedback path, thereby producing a drive current of a voice coil motor for position control of a magnetic head using as an input signal a digital current control signal being formed corresponding to positional information read from the magnetic head and position command information from a controller,
   wherein the forward path includes:
   a digital operation type phase compensator receiving the input signal;
   a ΔΣ modulator receiving an output signal of the phase compensator to convert the output signal into a control code of predetermined bits;
   a PWM modulator receiving the control code converted by the ΔΣ modulator to produce a PWM signal; and
   an output circuit receiving the PWM signal produced by the PWM modulator to drive a voice coil;
   wherein the feedback path includes:
   a sense amplifier sensing a current flowing in the voice coil;
   an ADC receiving an output signal of the sense amplifier;
   a first low-pass filter receiving an output signal of the ADC; and
   a first decimation filter receiving an output signal of the first low-pass filter; and
   wherein an output signal of the decimation filter is fed back to the input side of the phase compensator to form a major feedback loop having a first-order characteristic loop gain; and an output signal of the decimation filter is fed back to the output side of the phase compensator to form a minor feedback loop having a loop gain being flat until a target band frequency when viewed from the output side of the phase compensator.

2. The VCM driver according to claim 1,
   wherein the PWM modulator counts a reference clock to produce the PWM signal having a duty ratio corresponding to the control code.

3. The VCM driver according to claim 1,
   wherein the forward path further includes a second low-pass filter and a second decimation filter after the ΔΣ modulator.

4. The VCM driver according to claim 3,
   wherein a selection circuit is provided in the second low-pass filter and the second decimation filter, using the control code converted by the ΔΣ modulator as an input signal having the number of bits adapted to a PWM frequency of the PWM modulator.

5. The VCM driver according to claim 1, further comprising a zero-crossing compensation circuit which detects an error pulse between the PWM signal input to the output circuit and an output signal of the output circuit corresponding to the PWM signal and adds the error pulse to a PWM signal to be input next.

6. The VCM driver according to claim 5, wherein the zero-crossing compensation circuit includes: a dead time generating circuit of the output circuit; a counter counting a reference clock to produce a pulse corresponding to an error time corresponding to an actual pulse width of an output amplifier produced by the dead time generating circuit and a pulse width of the input PWM pulse; and an addition circuit adding the pulse produced by the counter to a PWM pulse to be input next.

7. The VCM driver according to claim 1, further comprising: a DAC converting an output code of the ΔΣ modulator into an analog signal; and a third low-pass filter receiving an output signal of the DAC to produce a drive control signal corresponding to the PWM signal, instead of the PWM modulator.

8. The VCM driver according to claim 1, further comprising: a first driving unit which passes an output code of ΔΣ through a second low-pass filter and a second decimation filter and then inputs an output of the second decimation filter to the PWM modulator to produce a PWM signal for driving an output amplifier; and a second driving unit which passes the output code of the ΔΣ modulator through the DAC converting the output code to an analog signal and then inputs an output signal of the DAC to a third low-pass filter to produce a linear signal for driving the output amplifier, wherein the output circuit is able to be switched between a first operation mode of selecting the first driving unit and a second operation mode of selecting the second driving unit; the first operation mode is set when a seek operation is performed; and the second operation mode is set when a tracking operation is performed.

9. The VCM driver according to claim 8, further comprising a zero-crossing compensation circuit which detects an error pulse between a PWM signal input to the output circuit and an output signal of the output circuit corresponding to the PWM signal and adds the error pulse to a PWM signal to be input next in the first mode.

* * * * *